United States Patent [19]

Mizuguchi et al.

[11] Patent Number: 5,352,551
[45] Date of Patent: Oct. 4, 1994

[54] PROCESS FOR STORING INFORMATION WITH HIGH STORAGE DENSITY

[75] Inventors: Jin Mizuguchi; Alain C. Rochat, both of Fribourg; Gérald Giller, Bulle, all of Switzerland

[73] Assignee: Ciba-Geigy Corporation, Ardsley, N.Y.

[21] Appl. No.: 55,641

[22] Filed: Apr. 30, 1993

Related U.S. Application Data

[63] Continuation of Ser. No. 805,427, Dec. 11, 1991, abandoned.

[30] Foreign Application Priority Data

Dec. 12, 1990 [CH] Switzerland ............... 3924/90-6

[51] Int. Cl.$^5$ ................ G11B 7/00; G11B 7/24
[52] U.S. Cl. .................... 430/17; 430/31; 430/56; 430/78; 430/495; 430/945; 365/112
[58] Field of Search .......... 430/495, 292, 346, 945, 430/17, 31, 56, 78; 346/135.1; 365/112

[56] References Cited

U.S. PATENT DOCUMENTS

| | | | |
|---|---|---|---|
| 4,307,047 | 12/1981 | Edinger et al. | 264/25 |
| 4,391,764 | 7/1983 | Edinger et al. | 264/25 |
| 4,415,685 | 11/1983 | Iqbal et al. | 524/92 |
| 4,426,434 | 1/1984 | Arishima et al. | 430/128 |
| 4,632,893 | 12/1986 | Rochat et al. | 430/58 |
| 4,760,004 | 7/1988 | Rochat et al. | 430/58 |
| 5,032,499 | 7/1991 | Kohno et al. | 430/566 |
| 5,144,333 | 9/1992 | Mizuguchi et al. | 346/1.1 |

FOREIGN PATENT DOCUMENTS

| | | |
|---|---|---|
| 0190997 | 2/1985 | European Pat. Off. . |
| 340968 | 11/1989 | European Pat. Off. . |
| 384665 | 8/1990 | European Pat. Off. . |
| 0401791 | 12/1990 | European Pat. Off. . |

OTHER PUBLICATIONS

Kunststoffe, Carl Hanser Verlag, München, pp. 1077–1081 (1986) (abst. enclosed), Kämpf et al.
J. Appl. Phys. 60(8) pp. 2932–2937 (Oct. 1986), Gupta et al.
Ca:106(12): 93722g; English Language Abstract of EP 190997 AZ, (Aug. 1986).
J. of Phys. Chem., vol. 89, No. 12, pp. 2652–2657 (1985), Law.
J. of Imaging Science, vol. 32, No. 3, pp. 135–140 (1988), Mizuguchi et al.
Chem. Abst. vol. 7 No. 202, p. 221 (1347) 1983; English Language Abstract of JP 58-100125, (Jun. 1983).
English Language Abstract of EP-401791, Mizuguchi et al., Dec. 1990.

*Primary Examiner*—Bowers, Jr. Charles L.
*Assistant Examiner*—John A. McPherson
*Attorney, Agent, or Firm*—George R. Dohmann

[57] ABSTRACT

A process for storing information in an organic recording layer which, when treated locally with an organic solvent in accordance with the input of information, is able to change its absorption spectrum and/or its photoconductivity such that information can be produced or stored at the treated areas of said layer, wherein the organic solvent is solid at room temperature and is present in the recording layer, or by decomposition of a solid organic precursor which is present in the recording layer, and said solvent is vaporized or melts by the action of laser beams in accordance with the input of information, or said precursor is decomposed by the action of laser beams in accordance with the input of information.

The stored information can be read out with a photodetector in the visible or near NIR range or with a built-in electrode system.

18 Claims, No Drawings

PROCESS FOR STORING INFORMATION WITH HIGH STORAGE DENSITY

This application is a continuation of application Ser. No. 07/805,427, filed Dec. 11, 1991.

The present invention relates to a process for storing information (WORM: "Write Once Read Many"), to a process for reading out said information, to the recording material onto which the information is written, and to specific optical substrates for recording said information. The principle of storing information is based on the change in the optical properties of the recording material by treatment with organic compounds which bring about solvent effects. Optical recording substrates and media for storing information are known (q.v. for example "Farbmittel/Polymer-Systeme als Datenspeicher" by G. Kämpf et al, in Kunststoffe pp. 1077–1081, Carl Hanser Verlag, Munich 1986; or "Erasable laser recording in an organic dye-binder optical disk medium", by M. C. Gupta et al, in J. Appl. Phys. 60 (8), 1986, pp. 2932–2937.]. In these publications, information is recorded by treatment with light of specific wavelengths and intensity or with other suitable energy-rich rays, as with a laser. Adsorption of the radiation effects a local rise in temperature at the irradiated areas, so that pits or local phase transfers are produced, which result in a change in the refractive index, of the absorption or of the reflectivity. By means of lasers it is possible to produce holes, bubbles or pits of about 1 to several $\mu m^2$ in size, which information can in rum be read by a laser of lesser intensity utilising the altered reflection or light-scattering behaviour of these holes/bubbles/pits or phase transfer. Suitable recording materials are typically metals, synthetic resins or other light-absorbing layers containing, for example, dyes.

Thus, for example, according to the teaching of U.S. Pat. No. 4,307,047 and 4,391,764 photosensitive additives such as thermal radiation indicators, carbon black or graphite are blended with a base plastics material for marking injection moulded parts made of said base plastics material, so that a visual marking is produced at the irradiated areas.

It is also taught in EP-A-190,997 to mark high molecular weight organic materials using pigments or polymer-soluble dyes for laser marking such that the surface of the written material is not perceptibly damaged.

It is also known to modify or to induce a shift in the light absorption of specific organic compounds as a separate layer or incorporated in a substrate by solvent vapour treatment. Thus solvent vapour treatment induces a shift in the light absorption of polymer films containing, for example, vanadyl phthalocyanine dyes, to longer wavelengths [q.v. J. of Physical Chemistry, Vol. 89, No. 12, pp. 2652–2657 (1985)], whereas a corresponding solvent treatment of 1,4-dithioketo-3,6-diphenylpyrrolo[3,4-c]pyrrole induces a shift in the light absorption to the near IR range(NIR) [q.v. J. of Imaging Science, Vol. 32, No. 3, May/June 1988, pp. 135–140]. In this last cited document, mention is also made to use such a property or the change in the photoconductivity of the so treated films occurring in the NIR spectral range for electrophotographic applications.

It is disclosed in EP-A-401.791, which has not yet been prior published, that the change in the absorption spectrum and/or the change in the photoconductivity of specific organic compounds after their treatment with an organic solvent can be used with advantage for storing information. To this end, the surface of the organic recording layer is treated with an organic solvent in the liquid or gaseous state in accordance with the input of information, for example by spraying the surface from a nozzle, as typically in an ink-jet printer.

It has now been found that a substantially higher storage density is possible if the solvent is released locally in the recording material by the action of laser beams.

Accordingly, the present invention relates to a process for storing information in an organic recording layer which, when treated locally with an organic solvent in accordance with the input of information, is able to change its absorption spectrum and/or its photoconductivity such that information can be produced or stored at the treated areas of said layer, wherein the organic solvent is solid at room temperature and is present in the recording layer, and said solvent is vapourised or melts by the action of laser beams in accordance with the input of information In an alternative embodiment of the process of this invention, which is also an object of the invention, the organic solvent is formed by the photochemical or thermal decomposition of a solid organic precursor present in the recording layer, which decomposition is effected by the action of laser beams.

A high storage density can be achieved with the process of this invention. Hence a pit having a size of less than one $\mu m^2$ is possible. The novel system is particularly suitable for write-once storage ("WORM") and, owing to the high reflectivity, is especially suitable for the writable compact disc system.

The organic recording layer contains the novel recording material itself as welt as the solid organic solvent or the solid organic precursor.

Illustrative examples of organic recording materials are quinacridones, dithioquinacridones, quinacridonequinones, phthalocyanines, diketo- and monoketomonothioketopyrroles and, preferably, dithioketopyrrolopyrroles, which are able to change their absorption and/or their photoconductivity by solvent treatment.

Examples of suitable pyrrolopoyrroles are 1,4-diketo-3,6-diphenylpyrrolo[3,4-c]pyrroles (q.v. for example U.S. Pat. No. 4,415,685) or the corresponding 1,4-diketo-3,6-diphenylpyrrolopyrroles (q.v. for example U.S. Pat. No. 4,632,893).

Exemplary of suitable quinacridones are derivatives of formulae I and II

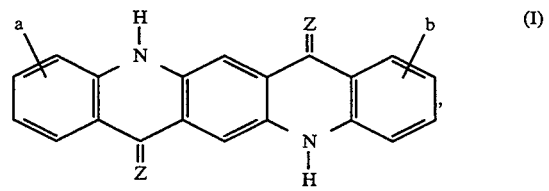

(I)

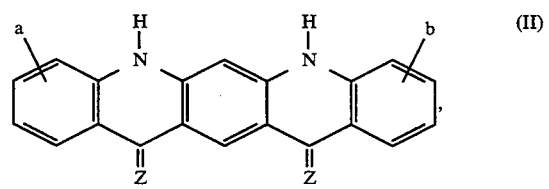

(II)

wherein a and b are —H, —F, —Cl, —Br, —CH₃ or —OCH₃, and Z is O or S. Also suitable is the quinacridonequinone of formula

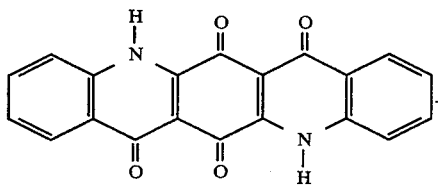

Preferred quinacridones are unsubstituted dithioquinacridones of the above formulae I and II, wherein a and b are —H and Z is S.

Illustrative examples of suitable phthalocyanines are metal phthalocyanines, such as titanyl, indium, chloroindium, aluminium, magnesium and, preferably, vanadyl phthalocyanine as well as metal-free phthalocyanine, and also metal-free or metal-containing naphthalocyanines, such as titanyl, indium, chloroindium, aluminium, magnesium, copper, nickel and vanadyl naphthalocyanine.

Preferred 1,4-dithioketo-, 1-monoketo-4-monothioketo-and 1,4-diketo-3,6-diphenylpyrrolo[3,4-c]pyrroles have the formula III

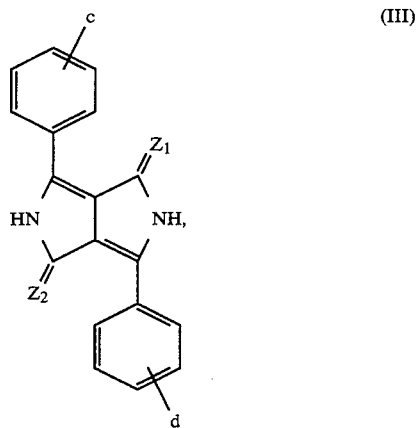

wherein $Z_1$ and $Z_2$ are each independently of the other O or S, and c and d are each independently of the other —H, —Cl, —BR, —CH₃, —OCl₃, —N(CH₃)₂, —SC₆H₅ or —S-alkyl of 1 to 12 carbon atoms. $Z_1$ and $Z_2$ are preferably S. $C_1$-$C_{12}$Alkyl is typically methyl, ethyl, n-propyl, n-hexyl, n-decyl and, preferably, n-dodecyl.

Especially preferred in the practice of this invention is the compound of formula III, wherein $Z_1$ and $Z_2$ are sulfur and c and d are —H (hereinafter abbreviated to DTPP).

Mixtures of pyrrolopyrroles of the above structures, mixtures of quinacridones, dithioquinacridones or phthalocyanines, as well as mixtures of these pigment classes, ,::an also be used.

It is convenient to use purified recording materials, for example after recrystallisation in a suitable inert organic solvent.

Solid organic solvents suitable for the inventive process preferably have a melting point above 90° C. They include ketones, benzil, benzoin, anthrone, dimedone, 4,4'-dimethoxybenzil, fluoren-9-one, 1,3-indanedione or tetraphenyl-2,4-cyclopentadien-1-one; ketones of the phenone type, such as 4-acetamidoacetophenone, 3-aminoacetophenone, 4-aminoacetophenone, 2-aminobenzophenone, 4-aminobenzophenone, 2-amino-5-chlorobenzophenone, 4-aminopropiophenone, 2,4-dihydroxybenzophenone, 4,4'-dihydroxybenzophenone, 4,4'-dimethoxybenzophenone, 4-hydroxybenzophenone, 4-hydroxypropionephenone or 4-phenylacetophenone; aldehydes, such as 4-acetamidobenzaldehyde, 3,4-dihydroxybenzaldehyde, 3,5-di-methoxy-4-hydroxybenzaldehyde 4-(dimethylamino)cinamaldehyde or 4-hydroxybenzaldehyde; heterocycles, such as 2-thiazoline-2-thiol, N-thiazol-2-ylsulfanilamide, 2-acetylpyrrole, 2-aminobenzothiazole, coumarin, 2,2-dimethyl-1,3-dioxane-4,6-dione, hydantoin, 4-hydroxycoumarin, 7-hydroxycoumarin, hydroxy-2-methylpyranone, isatin, 2-aminobenzothiazole, 2-mercaptobenzothiazole, 2-mercaptobenzoxazole, 2-methylbcnzimidazole, 2-methylimidazole, 3-methylindole, 3-methyl-1-phenyl-2-pyrazolin-5-one, oxindole, phenothiazine, 2-phenylimidazole, 4-phenylurazole, phthalazone, tetrahydrofuran-2,4-dione, 1,1'-thiocarbonyldiimidazole, thioxothiazolidin-4-one, xanthone, thianthrene, 4-amino-antipyrine or (4S ,SR )-(+)- 1,5-dimethyl-4-phenylimidazolin- 2-one; amides and hydrazides, such as 2-aminobenzamide, 4-aminobenzamide, 3-aminocrotonamide, 2-aminocyanoacetamide, benzamide, cyanoacetamide, 2-ethoxybenzamide, nicotinamide, thioacetamide, thiobenzamide, acetic acid 2-phenylhydrazide or oxalic acid bis(cyclohexylidenehydrazide); anilides, such as acetanilide, 4-aminoacetanilide, benzanilide or 4-methylacetanilide; imides, such as N-hydroxy-5-norbomene-2,3-dicarboximide, N-hydroxyphthalimide, N-hydroxysuccinimide, maleimide, malonimide or 1,2,3,6-tetrahydrophthalimide; carboxylic acids, such as 2-acetylbenzoic acid, acetylsalicylic acid, adipic acid, D-(+)-malic acid, 4-aminobutyricacid, 2-amino-5-chlorobenzoic acid,4-aminohippuric acid, 6-aminohexanoic acid, 3-benzoylpropionic acid, dehydracetic acid, L(+)-dehydroascorbic acid, hippuric acid, 2-iodohippuric acid, DL-mandelic acid,R-(-)-mandelic acid, mercaptosuccinic acid, 3-oxoglutaric acid, (S)-(—)-N-(1-phenylethyl)phihalamidic acid or malonic acid; quinones, such as acenaphthenequinone, anthraquinone, 2,3-dichloro-5,6-dicyano-p-benzoquinone, 1,4-dihydroxyanthraquinone, 2-ethylanthraquinone, 1,4-naphthoquinone, 9, 10-phcnanthrenequinone, tetramethyl-p-benzoquinone or menadione; ureas, such as N,N-dimethylurea, urea, N-methylurea, N-phenylurea,4-phenylsemicarbazid or 1-phenylsemicarbazido; thioureas, such as N-acetylthiourea, thiourea, N-phenylthiourea thiocarbohydrazide, thiobiuret, 1-phenylthiosemicarbazide, 4-phenylthiosemicarbazide or thiosemicarbazide; anhydrides, such as succinic anhydride, 3-nitrophthalic anhydride, phthalic anhydride, 1,2,3,6-tetrahydrophthalic anhydride or Epicion®B-4400 (Dainippon); sulfones, such as 2,3-dihydro- 1,2-benzisothiazol-3-one- 1,1 -dioxide, 4,6-diphenylthieno(3,4-d)-1,3-dioxol-2-one-5,5-dioxide or diphenylsulfone; sulfoxides, such as dibenzyl sulfoxide or diphenyl sulfoxide; carboxylates, such as diethyl acetamidomalonate, dimethyl-2-aminoterephthalate, ethyl (acetamidocyanoacetate), ethyl (2-amino-4-thiazolyl)glyoxylate, ethyl oxamate or dimethyl fumarate; aromatic hydrocarbons, such as 1,1—H-benzo(a)-fluorene, 1,1—H-benzo(b)fluorene, anthracene, 2-nitrofluorene or [2.2]-paracyclophane; as well as further suitable polyfunctional compounds such as acetyl-L-cystein, N-acetylglycine, acetylmethyl entriphenylphosphoran, 1,3-cyclohexadione, 1,3-cyclopentadione, desoxy-4-anisoin, 2,3-diphenyl-2-cyclopropen-1-one, 1,5-diphenylcarbazone, 9-fluroenylmethyl-succinimidylcarbonate, L-(+)-gulonic acid γ-lactone, N-hippuryl-L-arginine, N-hippuryl-L-phenylalanine, N-acetyl-L-cystein, N-acetylglycine, 2-methyl- 1,3-cyclohexanedione or 2-methyl- 1,3-cyclopentanedione.

Preferred solid solvents are benzil, 4-aminobenzophenone, 3,4-dihydroxybenzaldehyde, 2-methylbenzimidazole, malonic acid, acenaphthenequinone, N-phenylurea, thiourea, 4-methylacetanilide, diphenyl sulfone, dibenzyl sulfoxide or anthracene. Particularly preferred solvents are malonic acid, N-phenylurea and, most preferably, dibenzyl sulfoxide.

Suitable solid organic precursors which decompose to release solvent are typically metal salts of carboxylic acids, such as calcium acetate or manganese acetate or barium succinate. These salts decompose thermally to acetone or cyclopentanone and the corresponding metal carbonate.

In the practice of this invention, the process in which a direct solid solvent is used is preferred.

The organic recording layer is present on a support or substrate in any desired form and may be in the form of a separate layer as well as combined with an organic polymer/binder system, in which latter case the combined layer is either present on a support or itself simultaneously acts as substrate.

Illustrative of suitable supports or substrates are metal plates, metal films or metal sheets of aluminium, zinc, magnesium, copper, gold or alloys of these metals, also plastic sheets., films or parts onto which a metal coating has been deposited, for example aluminium-coated plastics materials, and also glass, ceramics, paper, wood or any plastics materials.

If the organic recording layer is in the form of a separate layer, the recording material is conveniently vapourised onto the substrate. If the recording layer is combined with a polymer system, then the organic recording material is preferably finely blended with the polymer or the binder by known techniques, and the blend is then applied to a suitable substrate or is itself shaped.

If the layer arrangement of the recording material comprises a single layer, then said layer consists of one or more organic compounds as defined herein, preferably in finely particulate form, which compounds may be combined with an organic polymer or binder. The polymer/binder system is preferably film-forming, insulating and, if the recording material is applied to a support or substrate, adhesive. Depending on the utility, the polymer/binder system is soluble in organic solvents or in basic mixtures of organic solvents which may contain water. Particularly suitable polymer/binder systems are those: based on polycondensates and polyadducts, such as polyamides, polyurethanes, polyesters, epoxy resins, phenoxy resins, polyketones, polycarbonates, polyvinyl ketones, polystyrenes, polyvinylcarbazoles, polyacrylamides, polymethylmethacrylates, polyvinyl butyrals, polyvinyl chlorides as well as copolymers, such as styrene-maleic anhydride copolymers or styrene-methacrylic acid-methacrylate copolymers. Transparent polymer/binders are preferred, for example polycarbonates, acrylic resins, alkyd melamine resins, polymethylmethacrylates and epoxy resins.

The recording material can also be applied to the substrate by dip-coating the substrate in as concentrated a solution as possible (e.g. 20–70%) of the recording material in a suitable organic solvent which is inert in the process of this invention.

The layer arrangement may also comprise a plurality of layers. In this case, a thin light-reflecting metal layer, typically a thin aluminium sheet, is initially applied to a support or substrate, and then the organic recording layer suitable for use in the practice of this invention is applied to said aluminium sheet. The information is written and read out with light from the recording layer of the system. If the reverse structure is used, the information can be recorded and read out from the substrate side of the system. Such a system is particularly suitable for the so-called reflection mode of reading out information.

The light-reflective layer should be so composed that it reflects as quantitatively as possible the light used for reading out information by scanning. Suitable light-reflective materials are metals such as aluminium, gold, rhodium, nickel, tin, lead, bismuth, copper and dielectric reflectors. The thickness of the reflective layer shall be such that it reflects the light required for scanning as completely as possible. For this purpose, reflectors of high reflectance are advantageous in the appropriate wavelength. The light-reflective layer conveniently has an optically smooth level surface and said surface is of such a nature the recording layer adheres firmly to it.

Application of the different layers can also be effected by applying to a transparent support or to the substrate first a transparent light-conductive layer as electrode, followed by the application of the organic recording layer and, finally, applying thereto a thin conductive metal layer. Such a layer arrangement is especially suitable for the photoconduction mode of reading out information. The form of the two electrodes is conveniently such that they are prepared in the form of a thin strip (e.g. from about 1 to a few 100 μm) by lithographic means or with a mask. Furthermore, these electrodes may be so arranged that they cross on the lower and upper layer. Such an arrangement is especially advantageous for storing information on, for example, security cards, PROM (programmable read only memory) or optical PWBs (printed wiring boards). The recording material may also contain further colourants, such as inorganic or organic pigments or polymer-soluble dyes, which are inert to the solvent treatment of this invention.

The novel process is, as stated, characterised by the use of an organic solvent or organic precursor which is solid at room temperature, and each of which is present in the recording layer and is vapourised or melted by laser beams or decomposed to the solvent. The solvent or precursor can simultaneously be blended with the recording material and thus form a uniform recording layer. However, the solvent or precursor may also form a separate layer within the recording layer, which separate layer lies either on the free surface of the recording material or preferably between the recording material and the reflective layer or substrate. Also possible are arrangements comprising a plurality of layers, for example of the type comprising substrate/solvent/recording layer/solvent/recording layer. Between the solvent and the recording layer it is also possible to apply a buffer layer, which blocks the diffusion of the solvent at room temperature.

The layer thickness of the recording layer can vary over a wide range and depends, inter alia, on the type of said layer. If the recording material is applied by vapour deposition, then the layer thickness is preferably 500–5000 Å, more particularly 1000–2500 Å and, most preferably, 1000 Å. If the recording material is dispersed in a polymer binder, for example in a concentration of up to 75% of pigment, then the preferred layer thickness is from 0.5 to 5 μm, preferably from 0.7 to 2.5 μm and, most preferably, about 1 μm. If the layer is formed by dip-coating the substrate in a solution of the recording material, then the layer thickness is preferably about 0.01 to 2 μm. The concentration of the recording material in the solution is preferably in the range from about 20–70% by weight.

If the solid solvent or the solid precursor is applied in a separate layer, then said layer has a thickness of about 100 Å to 2 μm, preferably 100 Å to 2 μm and, most preferably, of about 500 Å.

As already stated above, the recording layer and the metallic reflective layers can be applied by vapour deposition under vacuum. The material to be applied is first put into a suitable vessel, which may be equipped with a resistance heating, and placed into a vacuum chamber. The substrate onto which the material is to be deposited is clamped above the vessel with the material to be vapourised. The clamp is constructed such that the substrate can be rotated (e.g. at 50 rpm) and heated. The vacuum chamber is evacuated to about $1.3 \cdot 10^{-5}$ to $1.3 \cdot 10^{-6}$ mbar ($10^{-5}$ to $10^{-6}$ torr), and the hearting is adjusted such that the temperature of the material to be deposited rises to its vapourising temperature. The deposition is continued until the layer applied has the desired thickness. Depending on the system, first the recording material and then the reflective layer is applied, or conversely. The application of a reflective layer can in some cases be dispensed with.

The thickness of the layer formed by vapour deposition can be monitored with the aid of an optical system which measures the reflectivity of the reflective surface coated with the absorption material. It is preferred to monitor the growth of the layer thickness with a quartz resonator.

All the above layers may further contain suitable additives, such as levelling agents, surface-active agents or plasticisers in order to enhance the physical properties of the layers.

The local treatment of the organic recording layer is carried out with an organic solvent in the liquid or gaseous state, which solvent effects a change in the absorption spectrum of the claimed compounds and/or a change in their photoconductivity. This is done by exposing the recording layer obtained as described above to a laser beam in accordance with the input of information, whereupon the solid solvent or the solvent formed by decomposition of the precursor vapourises.

Illustrative examples of suitable lasers are diode lasers, especially semiconductor diode lasers such as GaAs lasers having of wavelength 780 or 830 nm, as well as InGaAlP lasers of wavelength 50 nm or argon lasers of wavelength 514 nm.

The information can be written point by point or linearly and innumerable types of marking can be obtained. Exemplary thereof are both visual and non-visual information in the micron range or below, typically from about 1 to 100 μm and more, such as variable text programming of numerical symbols, text programs of standard characters or special characters such as monograms, logos or frequently recurring data, continuous piece numbering, inputting measured variables, drawings or figures of any kind, and also decorations. A typical example is a photoreceptor panera of different figures or images which functions in accordance with conventional electrophotographic processes with integral exposure.

The process of this invention makes it possible to write/store information with a high degree of reliability, which information is dimensionally stable, light- and weather-resistant and easily legible, and which has clearly defined edge zone. Further, the stored information is highly resistant to temperature changes and UV rays.

As stated above, the solvent treatment of this invention effects a shift in the absorption spectrum and/or a change in the photoconductivity at the irradiated areas of the material. The shift in the absorption spectrum and/or the stored information can be read out visually, for example as a colour change with a written contrast, as with a photodetector system in the visible or NIR range.

Suitable photodetector systems typically comprise low-energy lasers, such as laser diode:; combined with PIN diodes, which are able to detect the change in absorption without at the same time the information contained in the material being destroyed, and also spectrophotometers which are able to measure the spectral changes in the UV, visible or NIR range of the written layer and the change in the transmission, reflection or absorption resulting therefrom, as for example a UV/NIR Lambda 9 spectrophotometer supplied by Perkin-Elmer or a UMSP 80 microscope spectrophotometer supplied by Carl Zeiss.

Using the quinacridones, quinacridonequinones, phthalocyanines, monoketomonothioketo- and dithioketopyrrolopyrroles eligible for use in the practice of this invention, the spectral shift occurs in the NIR range, whereas the shift in absorption of the diketopyrrolopyrrole derivatives takes place in the visible range.

For example, 1,4-diketo-3,6-diphenylpyrrolo[3,4-c]pyrrole (DPP) exhibits after treatment a visual colour change from red to orange (increase in the intensity of the absorption at 450 nm), the corresponding 1,4-dithioketo derivative exhibits a spectral shift of about 690 nm to about 830 nm, dithioquinacridone (q.v. formula I above; a and b =H; Z =S]exhibits a spectral shift of 700 nm to 770 nm, and vanadyl phthalocyanine exhibits an increase in the intensity of the absorption at 820 nm.

If the information is read out by reflection, then it is desirable to insert between the substrate and the organic recording layer of the invention a layer which is as completely reflective as possible, for example a thin metal sheet of typically aluminium, gold, platinum or silver. This layer can be bonded adhesively, but is preferably applied by vapour deposition.

When using compounds of formula III, but especially DTPP (1,4-diketo-3,6-diphenylpyrrolo[3,4-c]-pyrrole), the change in reflectivity can be enhanced by pretreating such compounds with an acid. The treatment with an acid can be carded out directly before the precipitation of the eligible DTPP compound, or the precipitated DTPP compound is dissolved again and then the acid is added to the solution. Such a pretreatment induces a shift in the absorption spectrum of the above compounds of formula HI or a decrease in the absorption of the compounds in the spectral range of 700–800 nm. This change leads after the solvent treatment of this invention to an even greater shift in absorption.

A vapourised DTPP layer exhibits, for example, an absorption shoulder in the range from 770–800 nm. Treatment of DTPP (e.g. dissolved in an organic solvent) with an acid, followed by precipitation or recrystallisation, results in a shift in the absorption of this compound to the extent that the shoulder disappears completely at 770–800 nm. The difference in reflectivity measured after the solvent treatment of the invention can thus be enhanced from about 30% to 80% and more.

Such a pretreatment with an acid is effected conveniently by dissolving a compound of formula III in an organic solvent and thereafter adding an acid. After the resultant solution has been left to stand for preferably 1 minute to 2 hours, the solution is poured onto ice or into a mixture of ice/water or recrystallised. The precipitated product is then isolated by conventional methods and dried, for example by filtration and subsequent drying at typically 50° C. under vacuum. The pretreated compound can then, as already described above, be processed to a recording layer.

Suitable solvents for this pretreatment are typically ketones, especially aliphatic ketones such as acetone, methyl ethyl ketone and methyl isobutyl ketone, or cyclohexanone, aliphatic alcohols such as methanol, ethanol or isopropanol, aliphatic ethers or esters, such as diethyl ether or ethyl acetate, also tetrahydrofuran, glycol ethers, such as ethylene glycol monoethyl or monomethyl ether or diethyl or dimethy glycol ether, and 1-acetoxy-2-ethoxyethane, as well as polar solvents such as acetonitrile, formamide, dimethyl formamide, dimethyl sulfoxide, N-methylpyrrolidone or dimethyl acetamide, and mixtures of the above solvents.

Examples of preferred solvents are acetone, ethanol, N-methylpyrrolidone and 1-acetoxy-2-ethoxyethane, more particularly dimethyl formamide and, most preferably, dimethyl sulfoxide (DMSO).

Suitable acids are organic or inorganic acids, such as formic acid, acetic acid or propionic acid, mono-, di- or trichloroacetic acid, oxalic acid, malonic acid succinic acid, phthalic acid, benzene- or toluenesulfonic acid, also phosphoric acid, nitric acid, hydrochloric acid or sulfuric acid. Examples of preferred acids are formic acid, acetic acid, hydrochloric acid and phosphoric acid, but more particularly nitric acid and, most preferably, sulfuric acid.

The acid concentration is conveniently in the range from $10^{-6}$ to $10^{-2}$ M (molar), but is preferably from $10^{-5}$ to $10^{-3}$ M.

Most preferred in the practice of this invention is the system DTPP which is pretreated with $H_2SO_4$, preferably in about $2 \cdot 10^{-4}$ molar concentration.

For reading out information in the transmission mode, a transparent layer is convenient, for example a polymethylmethacrylate or polycarbonate layer or glass.

A change in photoconductivity induced by the solvent treatment can be monitored with a built-in measuring electrode system.

For reading out information in the photoconduction mode it is convenient to use recording materials composed of a plurality of layers, for example by applying to the transparent substrate first a conductive underlayer as transparent electrode, then superposed thereon the organic layer of this invention and, finally, a second conductive underlayer as measuring electrode.

Transparent electrodes are preferably vapour-deposited and are typically of indium oxide, indium tin oxide, tin oxide doped with antimony, tin oxide or metallised organic films.

Measuring electrodes are typically of Al, Ni, Au or Ag and are conveniently in the form thin sheets.

Optical recording substrates comprising a substrate and a recording layer of this invention are novel and likewise an object of this invention.

A further object of the invention is the written material which is obtainable by the novel process.

The following Examples illustrate the invention.

EXAMPLE 1

Aluminium is vapourised under a high vacuum of about $3.2 \times 10^{-4}$ Pa ($3.2 \times 10^{-6}$ torr) onto a glass substrate to a thickness of about 2000 Å. The deposition rate is about 50 Å/s. Dibenzyl sulfoxide (ex Fluka) is vapourised onto the Al-coated substrate under the same conditions, followed by the deposition of 1,4-dithioketo-3,6-diphenylpyrrolo-[3,4-c]-pyrrole (DTPP). The layer thickness of the dibenzyl sulfoxide and of the DTPP is 500 and 1500 Å, respectively. Electronic information is written dotwise using a GaAs diode laser of 830 nm with 20 mW (Toshiba), and the reflectivity is monitored with the same wavelength using a PIN diode. The reflectivity before writing is 80% and 8% after writing.

EXAMPLE 2

The procedure of Example 1 is repeated, replacing DTPP with titanyl phthalocyanine (TiOPc). Reflectivities of 50% and 16% are measured before and after writing with a diode laser of 830 nm.

EXAMPLE 3

Example 1 is repeated, replacing DTPP with vanadyl phthalocyanine (VOPc) (ex Kodak). N-Phenylurea (ex Fluka) is vapourised in place of dibenzyl sulfoxide. Reflectivities of 35% and 10% are measured before and after writing with a diode laser of 830 nm.

EXAMPLE 4

Example 1 is repeated, using magnesium phthalocyanine (ex Tokyo Kasei) instead of DTPP and writing information dotwise with a GaAsAl diode laser of 780 nm. The reflectivity is 66% before writing and 3% after writing.

EXAMPLE 5

Malonic acid is dip-coated onto an Al/polycarbonate substrate from an 8% ethanol solution. DTPP is then vapourised onto the substrate to a thickness of about 1000 Å. Electronic information is written with a diode laser of 780 nm. The reflectivity before writing is 68% and 3% after writing.

EXAMPLE 6

Example 1 is repeated, except that 1-keto-4-thioketo-3,6-diphenylpyrrolo[3,4-c]pyrrole is vapourised instead of DTPP, information is written with an Ar laser of 514 nm, and reflectivity is monitored at 700 nm with a microscope-spectrophotometer. The reflectivity before writing is 70% and 18% after writing.

EXAMPLE 7

Example 1 is repeated, except that gold, epoxy substrate and unsubstituted quinacridone (about 1000 Å) are used instead of Al, glass substrate and DTPP. The information is written point by point with a GaAsAl diode laser of 780 nm and the reflectivity before writing is 83% and 10% after writing.

EXAMPLE 8

A polymer layer of about 1 gm consisting of polycarbonate and dibenzyl sulfoxide (about 8%) is applied in a coating unit, using tetrahydrofuran as solvent, to a Au/-glass substrate. Afterwards DTPP is applied in a layer thickness of about 1000 Å under vacuum. Electronic information is written with diode laser of 780 nm. The reflectivity before writing is 73% and 18% after writing.

What is claimed is:

1. A process for storing information in an organic recording layer, which comprises irradiating the organic recording layer with a laser beam, wherein the organic recording layer consists essentially of an organic recording material and a solid organic solvent or a solid organic precursor, and wherein the absorption spectrum and/or photoconductivity of said organic recording material changes in response to a liquid or vaporized organic solvent which is formed by the decomposition, melting and/or vaporization of the solid organic solvent or the solid organic precursor, which decomposition, melting and/or vaporization is effected by the irradiation of the organic recording layer with the laser beam.

2. A process of claim 1 wherein the solid organic solvent or precursor is blended with the recording material to form a uniform recording layer.

3. A process according to claim 1, wherein the recording material is a quinacridone, a dithioquinacridone, a quinacridonequinone, a phthalocyanine, a diketo-, monoketomonothioketo- or dithioketopyrrolopyrrole.

4. A process according to claim 3, wherein the quinacridone or dithioquinacridone is a compound of formula I or II

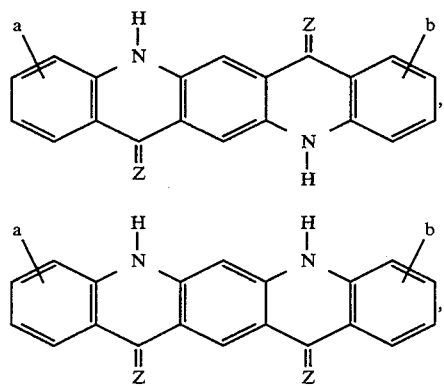

wherein a and b are —H, —F, —Cl, —Br, —CH$_3$ or —OCH$_3$, and Z is O or S.

5. A process according to claim 4, wherein a and b are —H and Z is S in formulae I and II.

6. A process according to claim 3, wherein the diketo-, monoketomonothioketo- or dithioketopyrrolopyrrole is a compound of formula IH

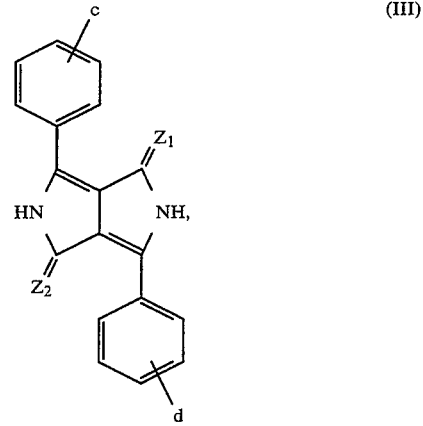

wherein $Z_1$ and $Z_2$ are each independently of the other O or S, and c and d are each independently of the other —H, —Cl, —Br, —CH$_3$, —OCH$_3$, —N(CH$_3$)$_2$, —SC$_6$H$_5$ or —S-alkyl of 1 to 12 carbon atoms.

7. A process according to claim 6, wherein $Z_1$ and $Z_2$ are S.

8. A process according to claim 6, wherein $Z_1$ and $Z_2$ are S and c and d are —H.

9. A process according to claim 1, wherein the recording layer is applied to a thin light-reflecting metal layer which in turn is applied to a support or a substrate.

10. A process according to claim 1, wherein a transparent support or a substrate is used to which first a transparent conductive layer as electrode is applied, followed by the application of the recording layer and then of a thin conductive metal layer.

11. A process according to claim 1, wherein the organic solvent forms a separate layer within the recording layer.

12. A process according to claim 11, wherein the separate layer is applied to a thin metallic layer which in turn is applied to a support or a substrate, or the separate layer is applied direct to a support or a substrate.

13. A process according to claim 1, wherein the organic solvent is selected from the group consisting of malonic acid, N-phenylurea and, dibenzyl sulfoxide.

14. A process according to claim 1, wherein the change in the absorption spectrum induced by the solvent treatment and the recorded information is read out by a microdetector.

15. A process according to claim 1, wherein the change in photoconductivity induced by the solvent treatment is monitored with a built-in electrode system.

16. An optical recording medium comprising a substrate and a recording layer as claimed in claim 1.

17. A recording material containing electronic information which is obtainable by a process as claimed in claim 1.

18. A process according to claim 1, wherein the organic precursor forms a separate layer within the recording layer.

* * * * *